United States Patent [19]

Sasaki et al.

[11] Patent Number: 4,966,699

[45] Date of Patent: Oct. 30, 1990

[54] HOLLOW FIBER MEMBRANE FLUID PROCESSOR

[75] Inventors: Masatomi Sasaki; Hirotomo Morita, both of Fuji; Yutaka Matsumoto, Fujinomiya, all of Japan

[73] Assignee: Terumo Kabushiki Kaisha, Tokyo, Japan

[21] Appl. No.: 335,543

[22] Filed: Apr. 10, 1989

[30] Foreign Application Priority Data

May 25, 1988 [JP] Japan .................. 63-129363

[51] Int. Cl.$^5$ ............................................. B01D 61/28
[52] U.S. Cl. ................... 210/321.8; 210/450; 210/500.23
[58] Field of Search .......... 210/321.8, 500.29, 500.30, 210/500.31, 450, 500.23

[56] References Cited

U.S. PATENT DOCUMENTS

| | | | |
|---|---|---|---|
| 3,864,289 | 2/1975 | Rendall | 210/500.29 X |
| 4,211,602 | 7/1980 | Brumfield | 156/644 |
| 4,389,363 | 6/1983 | Molthrop | 264/135 |
| 4,800,019 | 1/1989 | Bikson et al. | 210/321.8 |

FOREIGN PATENT DOCUMENTS

| | | |
|---|---|---|
| 0018734 | 11/1980 | European Pat. Off. . |
| 0145614 | 6/1985 | European Pat. Off. . |
| 0166237 | 1/1986 | European Pat. Off. . |
| 2622805 | 1/1977 | Fed. Rep. of Germany . |
| 2813197 | 10/1979 | Fed. Rep. of Germany . |
| 2518421 | 6/1983 | France . |

*Primary Examiner*—Frank Spear
*Attorney, Agent, or Firm*—Frishauf, Holtz, Goodman & Woodward

[57] ABSTRACT

A hollow fiber membrane fluid processing apparatus comprising a housing, a fluid processing hollow fiber membrane bundle in the housing, partitions fluid tightly securing the opposed ends of the fiber bundle to the housing ends, a space being defined by the hollow fiber membrane outer surface, the housing inner surface, and the partitions, inlet and outlet ports for a first fluid disposed in the housing adjacent the opposed ends thereof in fluid communication with the space, and inlet and outlet ports for a second fluid disposed at the housing ends in fluid communication with the interior of the hollow fiber membranes is characterized in that the portion of the hollow fiber membranes in contact with each partition swells little upon contact with water-containing fluid. When contacted with physiological saline for priming and the second fluid for processing, the partition-contacting portion of the hollow fiber membranes does not absorb substantial water or expand in wall thickness, that is, maintains the inner diameter unchanged, avoiding any deleterious effect on second fluid flow and an increase of pressure loss.

10 Claims, 5 Drawing Sheets

HOLLOW FIBER MEMBRANE FLUID PROCESSOR

BACKGROUND OF THE INVENTION

This invention relates to a hollow fiber membrane fluid processing apparatus as exemplified by artificial hollow fiber membrane dialyzers for use with renal insufficient patients for removal of deleterious matters and water from blood and for adjustment of electrolyte and plasma separators.

A variety of hollow fiber membrane fluid processing apparatus were used in the past. Artificial hollow fiber membrane dialyzers are well known among others. In general, such a hollow fiber membrane dialyzer is of the structure comprising a cylindrical housing having inlet and outlet ports for dialyzing fluid and a fiber bundle in the form of a plurality of closely juxtaposed dialyzing hollow fiber membranes extending through the housing. The opposed ends of the fiber bundle are secured to the corresponding opposed ends of the housing by partitions in a fluid tight seal therewith, the partitions being formed by casting potting compound in place. Headers or caps are attached to the opposed ends of the housing outside the partitions to define inlet and outlet ports for blood. The commonly used dialyzing hollow fiber membranes are hydrophilic membranes, typically membranes of regenerated celluloses such as cellulose acetate and cuprammonium cellulose. Polyurethane is a typical potting compound. Plasma separators of a similar structure are also used.

FIGS. 6 and 7 show in enlarged cross section a portion of the partition surrounding the hollow fiber membranes in a typical prior art hollow fiber membrane dialyzer of the above-mentioned construction. FIG. 6 shows dialyzing hollow fiber membranes 22 in dry state, that is, prior to the actual use of the dialyzer. In this state, the dialyzing membranes 22 including their portion embedded in the partition 20 retain the as-fabricated shape, that is, have a substantially uniform inner diameter throughout the length.

On use, the dialyzer is primed by passing physiological saline through a flowpath, which is defined by the bore of the hollow fiber membranes and assigned for passage of blood, to replace the existing air by the saline before blood is passed through the dialyzer. A dialyzing fluid is admitted into another flowpath which is defined by the outside surface of the membranes and the housing inner wall. Then the dialyzing membranes 22 are wetted with water. The membranes 22 in wet state are shown in the enlarged cross section of FIG. 7. When water-containing fluid contacts the dialyzing membranes 22 which are hydrophilic, they absorb water and swell, resulting in an increase of their wall thickness. In the portion of the membranes 22 outside the partition 20, the increase of wall thickness appears as an increase of outer diameter while the inner diameter remains substantially unchanged. In the portion of the membranes 22 embedded in or in contact with the partition 20, the increase of wall thickness appears as a reduction of inner diameter because the partition 20 fixedly secures the membrane outer surface and prohibits any change of outer diameter. As a result, the membranes 22 narrow or reduce their inner diameter where they are in contact with the partition 20, the narrowed flowpath disturbing blood flow, thus leaving the risks of thrombus formation, clogging, and blood stagnation as well as an increased pressure loss across the dialyzer. Similar problems occur in plasma separators.

OBJECTS OF THE INVENTION

An object of the present invention is to provide a novel and improved hollow fiber membrane fluid processing apparatus in which the hollow fiber membranes, for example, dialyzing hollow fiber membranes, when contacted with a fluid containing water, do not change their inner diameter where they are in contact with the partition and thus allows smooth blood flow, eliminating the risks of thrombus formation, clogging, and blood stagnation as well as an increased pressure loss.

SUMMARY OF THE INVENTION

Briefly stated, the present invention provides a hollow fiber membrane fluid processing apparatus comprising a housing having opposed open ends, a fiber bundle received in the housing and including a plurality of hollow fiber membranes for processing fluid, partitions fluid tightly securing the opposed ends of the fiber bundle to the corresponding ends of the housing, a space being defined by the outer surface of the membranes, the inner surface of the housing, and the partitions, an inlet and an outlet for a first fluid disposed in the housing adjacent the opposed ends thereof in fluid communication with the space, and an inlet and an outlet for a second fluid disposed at the opposed ends of the housing in fluid communication with the interior of the membranes.

According to a first aspect of the present invention, the wall portion of the hollow fiber membranes in contact with each of the partitions swells little upon contact with water-containing fluid. Preferably, the apparatus is a dialyzer wherein the membranes are adapted for dialysis.

According to a second aspect of the present invention, the wall portion of the hollow fiber membranes in contact with each of the partitions absorbs substantially less water than the remaining portion out of contact with the partition. Preferably, the apparatus is a dialyzer wherein the membranes are hydrophobic and adapted for dialysis.

BRIEF DESCRIPTION OF THE DRAWINGS

The above and other objects, features, and advantages of the present invention will be better understood from the following description taken in conjunction with the accompanying drawings, in which.

DESCRIPTION OF THE PREFERRED EMBODIMENTS

The hollow fiber membrane fluid processing apparatus according to the present invention will be described by referring to several preferred embodiments wherein the apparatus is applied as an artificial dialyzer.

Figure 1:
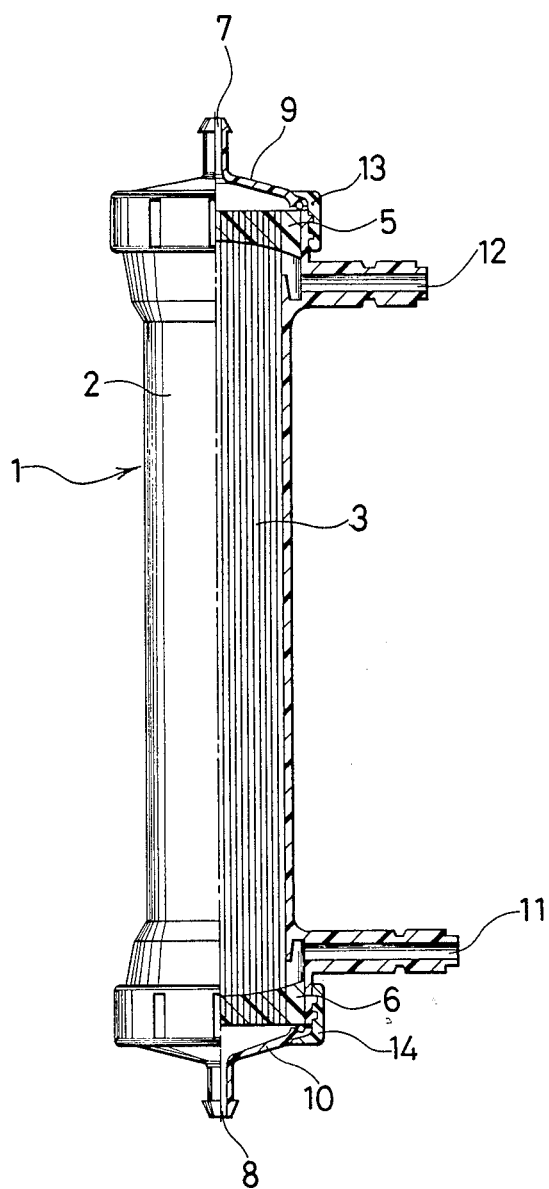
FIG. 1 is a partially cross-sectional elevation of a hollow fiber membrane dialyzer according to one preferred embodiment of the present invention.
Figure 2:
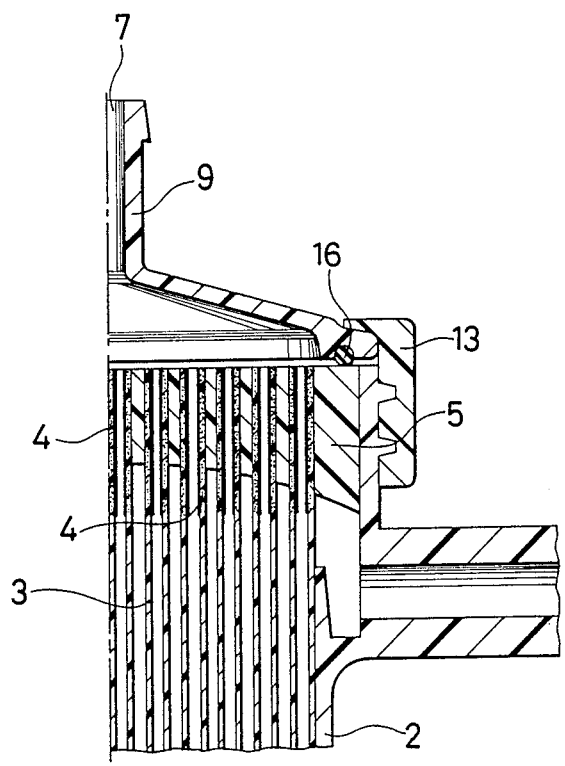
FIG. 2 is an enlarged cross section of a portion of the partition having hollow fiber membranes embedded therein in the dialyzer of FIG. 1.

Referring to FIG. 1, there is illustrated in partially broken-away elevation an artificial dialyzer as one preferred embodiment of the present invention. FIG. 2 is an enlarged cross section of a portion of the partition having hollow fiber membranes embedded therein in the dialyzer of FIG. 1.

The artificial dialyzer generally designated at 1 includes a housing 2 having opposed open ends, a fiber bundle received in the housing 2 and including a plurality of hollow fiber membranes 3 for processing fluid, partitions 5 and 6 fluid tightly securing the opposed ends of the fiber bundle to the corresponding ends of the housing, a space being defined by the outer surface of the membranes 3, the inner surface of the housing 2, and the partitions 5 and 6, an inlet 11 and an outlet 12 for a first fluid or dialyzing fluid disposed in the housing 2 adjacent the opposed ends thereof in fluid communication with the space, and an inlet 7 and an outlet 8 for a second fluid or blood disposed at the opposed ends of the housing 2 in fluid communication with the interior of the membranes. The portion of the membranes 3 in contact with the partition 5 or 6 absorbs substantially less water than the remaining portion which is out of contact with the partition.

The dialyzing hollow fiber membranes 3 used in the dialyzer 1 are hydrophilic hollow fiber membranes adapted for dialysis which may be formed from regenerated celluloses such as cellulose acetate and cuprammonium cellulose, cellulose derivatives, ethylene-vinyl alcohol copolymers, and acrylonitrile copolymers. They preferably have a wall thickness of about 5 to about 35 $\mu$m, more preferably about 10 to about 20 $\mu$m, and an outer diameter of about 50 to about 500 $\mu$m, more preferably about 100 to about 300 $\mu$m, with a bore extending throughout their length.

The artificial hollow fiber membrane dialyzer 1 is illustrated in complete assembly form in FIG. 1. The artificial dialyzer 1 includes a cylindrical housing 2 having opposed open ends and a fiber bundle received in the housing 2. The fiber bundle is generally composed of about 6,000 to about 50,000 dialyzing hollow fiber membranes 3 which longitudinally extend throughout the housing 2. The fiber bundle at its opposed ends is fluid tightly secured to the corresponding ends of the housing by the partitions 5 and 6 while the fiber openings are kept open to the outside of the partition. The partitions 5 and 6 in cooperation with the membranes 3 partition the housing chamber into a dialyzing fluid compartment which is defined by the outer surface of the membranes 3, the inner wall of the housing 2, and the inside surface of the partitions and a blood compartment which is defined by the bores of the membranes 3.

The housing 2 is generally molded from relatively rigid resins such as polycarbonate and acrylonitrile-styrene copolymers to a tubular, preferably cylindrical shape. The housing 2 is provided adjacent the opposed ends thereof with the inlet and outlet ports 11 and 12 for dialyzing fluid. These ports are in fluid communication with the dialyzing fluid compartment.

The partitions 5 and 6 are generally formed by casting potting compound, typically polyurethane and silicone rubber compounds in the opposed ends of the housing with the fibers set in place. A common practice is to cut the cast compound (having the fibers embedded therein) perpendicular to the fibers to form the partition. In such a preferred embodiment, the open end of the hollow fiber membranes is substantially flush with the outside surface of the partition as shown in FIG. 2.

An upper flowpath forming member 9 is secured to the upper end of the housing outside the upper partition 5 by thread engagement of a ring retainer 13. The upper flowpath forming member 9 is in the form of a generally conical cap having an annular collar and a tapered nipple defining the blood inlet 7. A lower flowpath forming member 10 is secured to the lower end of the housing outside the lower partition 6 by thread engagement of another ring retainer 14. The lower flowpath forming member 10 is also in the form of a generally conical cap having an annular collar and a tapered nipple defining the blood outlet 8. The annular collar of each of the conical caps 9 and 10 is provided with an annular channel in which an O-ring 16 of silicone rubber or the like is fitted as best shown in FIG. 2. The thread engagement of the retainer 13 forces the O-ring 16 in close abutment against the partition 5, completing fluid tight engagement of the cap 9 with the partition 5. The inlet and outlet ports 7 and 8 are in fluid communication with the blood compartment or hollow fiber membrane bores.

Although the retainer for thread engagement is used in the illustrated embodiment, the flowpath forming member may be directly bonded to the housing end by fusion welding such as RF or ultrasonic welding and adhesive bonding.

As shown in FIG. 2, in the region where the hollow fiber membranes 3 are in contact with or embedded in the upper partition 5, a hydrophobic resin 4 is present on the inner and end surfaces of the membranes, and within the membranes themselves if desired. Then the inner and end surfaces of the membranes in this contact region afford hydrophobic surfaces so that the portion of the membranes in contact with the partition absorbs little water. The same applies to the portion of the membranes where they are in contact with the lower partition 6.

The presence of hydrophobic resin on and/or in the hollow fiber membranes in the region surrounded by the partition prevents that portion of the membranes from absorbing a substantial amount of water when the membranes are contacted with water-containing fluid, thereby controlling expansion of the membrane wall. The presence of hydrophobic resin on the membranes may be provided, for example, by coating. The hydrophobic resin may be present only on the surface of the membranes, but may also penetrate partially or entirely into the membranes. It is also preferred that the partitions are coated over their entire surfaces with the hydrophobic resin 4 because coating can render smooth the outside surface of the partition which is formed by cutting the cast compound and is thus often rough. The hydrophobic resin coating 4 may have a thickness of about 0.01 to about 50 $\mu$m, preferably about 0.1 to about 10 $\mu$m. Preferably part of the hydrophobic resin 4 penetrates into the membranes. Also preferably, the hydrophobic resin 4 is solidified. Thus most preferably, the hydrophobic resin 4 is solidified and partially penetrates into the membranes. Solidification and/or penetration of the hydrophobic resin is effective in preventing expansion of the membrane wall, dissolving away of the resin into blood during blood circulation, and delamination of the resin.

In addition to the coating technique, the hydrophobic resin can be present on and/or in the membranes in the region in direct contact with the partition by incorporating the hydrophobic resin or other hydrophobic material into the membranes in said region. Then that portion of the membranes in direct contact with the partition absorbs no substantial water when the membranes are contacted with water-containing fluid.

The materials which are incorporated in the hollow fiber membranes or applied to the inside and end surfaces of the membranes in the region radially surrounded by the partition are preferably those materials which are well compatible with living bodies, that is, have anti-thrombosis and hydrophobic properties. Examples include silicone, urethane, and fluoride resins. The silicones include dimethylsilicone fluid, methylphenylsilicone fluid, methylchlorophenylsilicone fluid, branched dimethylsilicone fluid, two part RTV silicone rubbers (for example, copolymers of vinylmethylsiloxane and methylhydrogensiloxane), one part RTV silicone rubbers, and mixtures of such a silicone fluid and a silicone rubber. Most preferred are reactive modified silicone fluids. Polyurethane is a typical urethane resin. Examples of useful fluoride resins include polytetrafluoroethylene, polytrifluoroethylene, and perfluoroacrylate.

The coating or incorporation of the hydrophobic material to the membranes should be substantially limited to only the portion of the membranes where they are in contact with the partition. That is, the application of the hydrophobic material to the membranes is limited to only the portion of the membranes adjoining the partition or the portion of the membranes adjoining the partition and longitudinally extending slightly beyond the partition. If the hydrophobic material is applied to the membranes far beyond the partition adjoining portion, then that additional portion of the membranes also becomes hydrophobic, losing the dialysis function.

In another form, the present invention provides a hollow fiber membrane fluid processing apparatus comprising a housing having opposed open ends, a fiber bundle received in the housing and including a plurality of hollow fiber membranes for processing fluid, partitions fluid tightly securing the opposed ends of the fiber bundle to the corresponding ends of the housing, a space being defined by the outer surface of the membranes, the inner surface of the housing, and the partitions, an inlet and an outlet for a first fluid disposed in the housing adjacent the opposed ends thereof in fluid communication with the space, and an inlet and an outlet for a second fluid disposed at the opposed ends of the housing in fluid communication with the interior of the membranes, wherein the portion of the membranes in contact with each of the partitions swells little upon contact with water-containing fluid.

In order to convert the portion of the hollow fiber membranes in contact with the partition into a portion that swells little upon contact with water, that portion may be treated with a reagent having a reactive group capable of reaction with a polar group that the hollow fiber membranes possess or a material contained in the membranes possesses.

Figure 3:
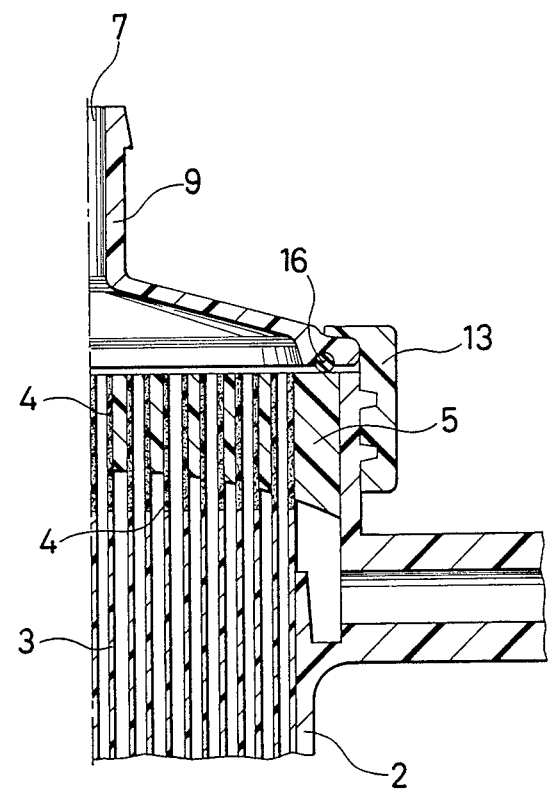
FIG. 3 is an enlarged cross section of a blood port portion in a hollow fiber membrane fluid processing apparatus according to another preferred embodiment of the present invention.

FIG. 3 is an enlarged cross section of a portion of the partition 5 having embedded therein hollow fiber membranes 3 whose partition adjoining portion is treated with such a reactive reagent.

Preferred membranes 3 for processing fluid include dialyzing and plasma separating hollow fiber membranes formed from regenerated celluloses such as cellulose acetate and cuprammonium cellulose, cellulose derivatives, ethylene-vinyl alcohol copolymers, and acrylonitrile copolymers. Then the polar group that the hollow fiber membranes 3 possess or a material contained in the hollow fiber membranes 3 possesses may be selected from the group consisting of a hydroxyl group, an amino group, and a carboxyl group. Examples of the material contained in the hollow fiber membranes include water and glycerin.

The reactive group that the reagent used for the treatment of hollow fiber membranes possesses may be selected from the group consisting of an isocyanate group, an epoxy group, a thiocyanate group, an acid chloride group, or an aldehyde group. Epoxy and isocyanate groups are preferred. The most preferred treating reagents are those having a highly active isocyanate group, for example, diphenylmethane diisocyanate, 2,4-tolylene diisocyanate, hexamethylene diisocyanate, and carbodiimide modified diphenylmethane diisocyanate. Useful reagents having an epoxy group are epichlorohydrin and 1,4-butanediol diglycidyl ether.

When the portion of hollow fiber membranes in contact with the partition is treated with a reagent having such a reactive group, the reactive group of the treating reagent reacts with the polar group of the membranes or the polar group of the material contained in the membranes to form a three dimensional matrix, fixing the structure of the treated portion of the membranes. Thus the treated portion of the membranes absorbs no substantial water when contacted with water-containing fluid, preventing expansion of the membrane wall.

It is preferred that the treating reagent having a reactive group penetrates into the membranes so that fixing reaction prevails to the interior of the membranes. To this end, the treating reagent should have a relatively low molecular weight, for example, a molecular weight of about 50 to about 30,000, more preferably about 100 to about 1,000.

The treating reagent may preferably be diluted with a solvent to form a less viscous solution with which the membranes are treated. The use of such a solution of the treating reagent renders the treatment feasible and reliable because the solution form facilitates application or flow of the reagent into the membrane bores and promotes penetration of the reagent into the membrane interior. The solvent varies depending on a particular reactive reagent used. Preferred examples of the solvents which are least reactive with the reagent and in which the reagent is soluble include acetone, chloroform, methyl ethyl ketone, benzene, ethyl acetate, dioxane, dimethyl sulfoxide, and dimethylformamide. A less viscous solution of the reagent in such a solvent is more effective in treating the membranes by taking advantage of swelling of the membranes during treatment. The treating time also varies depending on the temperature, solvent and reagent used. At room temperature, the treating time generally ranges from about 5 seconds to about 30 minutes, preferably from about 1 to about 20 minutes for a solvent mixture of benzene and dimethyl sulfoxide (9:1), and the treating time ranges from about 5 seconds to about 2 hours, preferably from about 10 seconds to about 1 hour for a solvent mixture of chloroform and dimethyl sulfoxide (9:1).

The hollow fiber membrane dialyzer 1 illustrated above is sterilized prior to actual operation. To this end, any conventional well-known sterilization techniques may be used including ethylene oxide gas sterilization and autoclave sterilization. Autoclave sterilization may be carried out by charging the interior of the dialyzer (including both dialyzing fluid and blood compartments) with a physiologically safe fluid (e.g., physiological saline and aseptic water), plugging the openings (including dialyzing fluid inlet and outlet ports and blood inlet and outlet ports) with resilient caps, and then placing the dialyzer in an autoclave. Since the portions of the dialyzing hollow fiber membranes in contact with the partitions have a hydrophobic material coated thereon or incorporated therein or have been treated with a reagent having a reactive group capable of reaction with a polar group that the membranes possess or a material contained in the membranes possesses, these membrane portions (on the inside surface) absorb little water or swell little. Thus the coated or treated membrane portions are not impregnated with water when the dialyzer is charged with clean water for protection during autoclave sterilization. Expansion of the membrane wall is thus prohibited in the coated or treated membrane portions, and any reduction in inner diameter of these membrane portions is prevented throughout periods of water charging and autoclave sterilization.

Although the artificial dialyzer is described and illustrated as a typical example of the hollow fiber membrane fluid processing apparatus of the present invention, the invention may be applied to a variety of fluid processing apparatus such as plasma separators and liquid separators without a substantial modification.

The fabrication of a hollow fiber membrane dialyzer according to the present invention is briefly described.

First, a cylindrical housing is molded which has opposed open ends and inlet and outlet nozzles projecting from its side wall. A bundle of dialyzing hollow membrane fibers is longitudinally inserted into the housing. The fibers are uniformly distributed over the cross section of the open housing ends. A cover containing a fill-up agent is secured to each open end of the housing such that the fill-up agent fills up the open ends of the fibers. Then a potting compound is centrifugally cast into the housing through the inlet and outlet nozzles to fixedly embed the fibers in the compound, bonding the fiber end portions to the housing ends. The covers are then removed and the cured potting compound at each end is sliced transversely to complete a partition. The partition portion is then dipped in a hydrophobic material, for example, a liquid hydrophobic resin or a solution of a hydrophobic resin (which is not liquid or too viscous as such) in a solvent (in which the resin is soluble, but the membranes and potting compound are sparingly soluble or insoluble), to fill the bores of the hollow fibers in the partition-adjoining portion with the hydrophobic material. If the hydrophobic material cannot be introduced into the fiber bores simply by dipping, it can be forcedly introduced by plugging the inlet and outlet nozzles, connecting the opposite (or upper) partition portion to a suction device such as a vacuum pump, and vacuuming the fiber bores to suck in the material.

At the end of dipping, the (lower) partition portion is taken up from the hydrophobic resin liquid or solution. Excess hydrophobic resin liquid or solution on the inside surface of the fibers in the partition area is then removed by connecting the opposite partition portion to a blower and blowing gas such as air into the fiber bores. The suction device and the blower may be a single unit of suction and pressure type. If the single operation described above is insufficient for the hydrophobic material to adhere to the fiber inside surface, such operation is repeated. The deposit of the hydrophobic material is then dried to bond a hydrophobic coating to the fiber inside surface. During removal of excess hydrophobic resin liquid or solution by blowing of gas into the fiber bores, a part of expelled resin will deposit on the outside wall of the partition. Such uneven deposits of the resin may be removed from the partition outside wall using a scraper in the form of a plastic or rubber plate.

The same operation as described above is repeated on the opposite partition portion, accomplishing coating of the hydrophobic material onto the inside surface of the hollow fiber membranes in the regions surrounded by the partitions. Thereafter, a flowpath forming cap is attached to each end of the housing, completing the dialyzer.

The fabrication of the dialyzer is not limited to the above-described procedure. One exemplary procedure involves assembling a plurality of dialyzing hollow fibers into a bundle, immersing one end portion of the fiber bundle in a hydrophobic material or a treating solution of a reactive group-bearing reagent, removing the treated end portion from the solution, blowing air through the fiber bores from the end opposite to the treated end to remove excess treating solution, washing the fiber bores with wash liquid, treating the other end portion of the fiber bundle in the above-described order, drying the fiber bundle, inserting the fiber bundle into a housing, and casting potting compound (e.g., polyurethane) to embed the end portions of the bundle therein to form partitions through which the fiber bundle is secured to the housing ends.

EXAMPLE

Examples of the present invention are given below by way of illustration and not by way of limitation.

Example 1

An artificial hollow fiber membrane dialyzer as shown in FIG. 1 was fabricated by molding polycarbonate into a housing having a length of 198 mm, an inner diameter of 44 mm at the opposed ends and an inner diameter of 32 mm at a midpoint. Into the housing were inserted about 7,100 dialyzing hollow membrane fibers of cuprammonium cellulose each having an inner diameter of about 200 $\mu$m and a wall thickness of about 12 $\mu$m. A polyurethane potting compound was cast to the opposed ends to form partitions having the fibers embedded therein. The thickest portion of the partition in close contact with the housing had a length of 15 mm.

The hydrophobic resin used was a reactive silicone (commercially available under the tradename NCT-911 from Toshiba Silicone K.K. of Japan, a silicone composition of 50% of silicone, 10% of isopropyl alcohol, and 40% of toluene). The reactive silicone was diluted with trifluoroethane (commercially available under the tradename Freon TF from Mitsui Chloro-Chemical K.K. of Japan) to form a 5 wt % silicone solution, which was poured in a vat. One end portion of the housing enclosing the partition and fibers was dipped into the solution over a distance of about 15 mm from the partition outside surface for 15 minutes. The housing was lifted up. A blower was connected to the opposite end portion of the housing to pass compressed air through the fiber bores at a flow rate of 30 1/min. for 30 minutes, expelling excess silicone solution from the inside surface of the fibers in the end portion. The same operation as above was repeated on the opposite end portion of the housing to coat the inside surface of the fibers in the opposite end portion with the silicone. Thereafter, the housing was allowed to stand for one day at room temperature for drying.

This dipping to drying procedure was repeated three times. Then a flowpath forming member in the form of a generally conical cap of polypropylene was attached to each end of the housing outside the partition, completing the artificial hollow fiber membrane dialyzer.

This dialyzer had an effective membrane surface area of about 0.8 square meter.

Comparative Example 1

An artificial hollow fiber membrane dialyzer as shown in FIG. 1 was fabricated by molding polycarbonate into a housing having a length of 198 mm, an inner diameter of 44 mm at the opposed ends and an inner diameter of 32 mm at a midpoint. Into the housing were inserted about 7,100 dialyzing hollow membrane fibers of cuprammonium cellulose each having an inner diameter of about 200 μm and a wall thickness of about 12 μm. A polyurethane potting compound was cast to the opposed ends to form partitions having the fibers embedded therein. The thickest portion of the partition in close contact with the housing had a length of 15 mm.

Then a flowpath forming member in the form of a generally conical cap of polypropylene was attached to each end of the housing outside the partition, completing the artificial hollow fiber membrane dialyzer.

This dialyzer had an effective membrane surface area of about 0.8 square meter.

Example 2

An artificial hollow fiber membrane dialyzer as shown in FIG. 1 was fabricated by molding polycarbonate into a housing having a length of 198 mm, an inner diameter of 44 mm at the opposed ends and an inner diameter of 32 mm at a midpoint.

A fiber bundle was prepared by assembling about 7,100 pretreated dialyzing hollow membrane fibers of cuprammonium cellulose each having an inner diameter of about 200 μm. The fibers were treated with a reagent having a reactive group. To this end, diphenylmethane diisocyanate (commercially available under the tradename TP-0001 from Nihon Polyurethane Industry K.K. of Japan, containing castor oil) was dissolved in acetone to form a treating solution containing 20% by weight of diphenylmethane diisocyanate. The fiber bundle at one end was immersed in the solution over a distance of about 2 cm from the bundle end while the solution was stirred by a magnetic stirrer. After immersion for 20 minutes at room temperature, the bundle was taken out of the solution. A blower was connected to the other end of the fiber bundle to pass air through the fiber bores under a pressure of 1.0 kg/cm$^2$, blowing off excess treating solution from the fiber bores. Then the fibers were washed with methylene chloride wash liquid. More particularly, the treated portion of the fibers was immersed in the wash liquid. Immediately after it was observed that the wash liquid was sucked in the fiber bores in the treated region, the fiber bundle was lifted out of the wash liquid. The blower connected to the other end of the fiber bundle was actuated to feed air through the fiber bores under a pressure of 1.0 kg/cm$^2$, blowing off wash liquid from the fiber bores. This washing procedure was repeated three times each with fresh wash liquid.

The same operation as above was repeated on the opposite end portion of the fiber bundle. Thereafter, the fiber bundle was dried in an oven at 40° C.

The fiber bundle was inserted into the housing. A polyurethane potting compound was cast to the opposed ends to form partitions having the fibers embedded therein. The thickest portion of the partition in close contact with the housing had a length of 15 mm. The portion of the hollow membrane fibers treated with the reagent had a length of about 20 mm.

Then a flowpath forming member in the form of a generally conical cap of polypropylene was attached to each end of the housing outside the partition, completing the artificial hollow fiber membrane dialyzer.

This dialyzer had an effective membrane surface area of about 0.8 square meter.

Example 3

A dialyzer was fabricated by the same procedure as in Example 2 except that the treating solution of the reagent having a reactive group was replaced by a solution of 10 wt % carbodiimide-modified diphenylmethane diisocyanate in benzene/dimethyl sulfoxide (9/1) mixture.

Example 4

A dialyzer was fabricated by the same procedure as in Example 2 except that the treating solution of the reagent having a reactive group was replaced by a solution of 10 wt % carbodiimide-modified diphenylmethane diisocyanate in chloroform/dimethyl sulfoxide (9/1) mixture.

Example 5

An artificial hollow fiber membrane dialyzer as shown in FIG. 1 was fabricated by molding polycarbonate into a housing having a length of 198 mm, an inner diameter of 44 mm at the opposed ends and an inner diameter of 32 mm at a midpoint. Into the housing were inserted about 7,100 dialyzing hollow membrane fibers of cuprammonium cellulose each having an inner diameter of about 200 μm. A polyurethane potting compound was cast to the opposed ends to form partitions having the fibers embedded therein, obtaining a dialyzer module. The thickest portion of the partition in close contact with the housing had a length of 15 mm.

A treating solution of a reagent having a reactive group was prepared by dissolving 10 wt % diphenylmethane diisocyanate in dimethyl sulfoxide/dioxane/Freon (2/3/5) mixture. The solution was poured into a glass dish to a depth of about 5 mm. One end portion of the fibers surrounded by the partition was treated with the solution by placing the module upright with one end on the glass dish, maintaining for one minute, lifting out of the solution, removing excess treating solution from the fiber bores, and wiping off excess treating solution from the partition outside surface. The other end portion of the fibers surrounded by the other partition was similarly treated. Thereafter, the module was dried overnight in an oven at 40° C.

Then a flowpath forming member in the form of a generally conical cap of polypropylene was attached to each end of the housing outside the partition. The fiber bores were washed with wash liquid by first circulating a mixture of (3/7) dioxane/water through the module for 30 minutes and then water for another 10 minutes.

Example 6

An artificial hollow fiber membrane dialyzer as shown in FIG. 1 was fabricated by molding polycarbonate into a housing having a length of 198 mm, an inner diameter of 44 mm at the opposed ends and an inner diameter of 32 mm at a midpoint.

A fiber bundle was prepared by assembling about 7,100 pretreated dialyzing hollow membrane fibers of cuprammonium cellulose each having an inner diameter of about 200 $\mu$m. The fibers were treated with a reagent having a reactive group. To this end, diphenylmethane diisocyanate was dissolved in a mixture of dimethyl sulfoxide and benzene (1/9) to form a treating solution containing 10% by weight of diphenylmethane diisocyanate. The fiber bundle at one end was immersed in the solution over a distance of about 2 cm from the bundle end while the solution was stirred by a magnetic stirrer. After immersion for 20 minutes at room temperature, the bundle was taken out of the solution. A blower was connected to the other end of the fiber bundle to pass air through the fiber bores under a pressure of 1.0 kg/cm$^2$, blowing off excess treating solution from the fiber bores. Then the fibers were washed with methylene chloride wash liquid. More particularly, the treated portion of the fibers was immersed in the wash liquid. Immediately after it was observed that the wash liquid was sucked in the fiber bores in the treated region, the fiber bundle was lifted out of the wash liquid. The blower connected to the other end of the fiber bundle was actuated to feed air through the fiber bores under a pressure of 1.0 kg/cm$^2$, blowing off wash liquid from the fiber bores. This washing procedure was repeated three times each with fresh wash liquid.

The same operation as above was repeated on the opposite end portion of the fiber bundle. Thereafter, the fiber bundle was dried overnight in an oven at 40° C.

The fiber bundle was inserted into the housing. A polyurethane potting compound was cast to the opposed ends to form partitions having the fibers embedded therein. The thickest portion of the partition in close contact with the housing had a length of 15 mm. The portion of the hollow membrane fibers treated with the reagent had a length of about 20 mm.

Then a flowpath forming member in the form of a generally conical cap of polypropylene was attached to each end of the housing outside the partition, completing the artificial hollow fiber membrane dialyzer.

This dialyzer had an effective membrane surface area of about 0.8 square meter.

Example 7

A dialyzer was fabricated by the same procedure as in Example 6 except that the treating solution of the reagent having a reactive group was replaced by a solution of 10 wt % diphenylmethane diisocyanate in dimethyl sulfoxide/dioxane/ Freon (2/4/4) mixture and containing 5 wt % of triethanolamine additive.

Comparative Example 2

An artificial hollow fiber membrane dialyzer as shown in FIG. 1 was fabricated by molding polycarbonate into a housing having a length of 198 mm, an inner diameter of 44 mm at the opposed ends and an inner diameter of 32 mm at a midpoint. Into the housing were inserted about 7,100 dialyzing hollow membrane fibers of cuprammonium cellulose each having an inner diameter of about 200 $\mu$m. A polyurethane potting compound was cast to the opposed ends to form partitions having the fibers embedded therein. The thickest portion of the partition in close contact with the housing had a length of 15 mm.

Then a flowpath forming member in the form of a generally conical cap of polypropylene was attached to each end of the housing outside the partition, completing the artificial hollow fiber membrane dialyzer.

This dialyzer had an effective membrane surface area of about 0.8 square meter.

Experiment 1

Two samples were prepared for each of the artificial hollow fiber membrane dialyzers of Example 1 and Comparative Example 1. One sample was in dry state while the other sample was in wet state. The partition of each dialyzer sample in dry state was sliced at a thickness of about 5 mm from the outside surface. On the sliced section, 40 hollow membrane fibers in dry state were measured for inner diameter (I.D.) and wall thickness.

The dialyzer samples in wet state were prepared by filling the dialyzer interior with distilled water and subjecting the dialyzer to autoclave sterilization at 121° C. for 90 minutes. The dialyzer was emptied of the filler water. The partition of each dialyzer sample was sliced at a thickness of about 5 mm from the outside surface while it remained wet. On the sliced section, 40 hollow membrane fibers in wet state were measured for inner diameter (I.D.) and wall thickness.

For the measurement, a universal magnifying projector UP-350 manufactured by Olympus K.K. of Japan was used. The results are shown in Table 1.

TABLE 1

| | Dry state | | Wet state | |
|---|---|---|---|---|
| | I.D. ($\mu$m) | Wall ($\mu$m) | I.D. ($\mu$m) | Wall ($\mu$m) |
| E 1 | 199.8 ± 14.7 | 12.7 ± 4.3 | 192.4 ± 10.6 | 18.8 ± 4.9 |
| CE 1 | 201.1 ± 15.2 | 11.9 ± 2.8 | 174.8 ± 20.0 | 26.9 ± 4.0 |

Experiment 2

A dyeing test was carried out. Tested were the artificial hollow fiber membrane dialyzers of Example 1 and Comparative Example 1. The partition of each dialyzer was sliced at a thickness of about 5 mm from the outside surface. A dye solution was prepared containing 0.04 w/v % of a basic dye, toluidine blue having a molecular weight of 305.8. The partition slice was immersed in the dye solution for 3 minutes, then thoroughly washed with water, and observed using a universal magnifying projector UP-350 manufactured by Olympus K.K. of Japan.

In the partition slice from the dialyzer of Comparative Example 1, the hollow fiber membranes were entirely dyed blue. In the partition slice from the dialyzer of Example 1, no hollow fiber membranes were dyed over their entire cross section, indicating that silicone had penetrated throughout the hollow fiber membrane wall.

Experiment 3

The partition of each of the artificial hollow fiber membrane dialyzers of Example 1 and Comparative Example 1 was sliced at a thickness of about 5 mm from the outside surface. The sliced surface of the partition was observed under a scanning electronmicroscope (JSM 803, Nihon Electron K.K. of Japan). The sliced partition surface of Comparative Example 1 was rugged. The sliced partition surface of Example 1 was observed flat and smooth. In Example 1, uneven distribution of the silicone and rounding of the hollow fiber edge were not observed.

Experiment 4

Two samples were prepared for each of the artificial hollow fiber membrane dialyzers of Examples 2-7 and Comparative Example 1. One sample was in dry state while the other sample was in wet state. The partition of each dialyzer sample in dry state was sliced at a thickness of about 5 mm from the outside surface. On the sliced section, 30 hollow membrane fibers in dry state were measured for inner diameter (I.D.) and wall thickness.

The dialyzer samples in wet state were prepared by filling the dialyzer interior with distilled water and subjecting the dialyzer to autoclave sterilization at 121° C. for 90 minutes. The dialyzer was emptied of the filler water. The partition of each dialyzer sample was sliced at a thickness of about 5 mm from the outside surface while it remained wet. On the sliced section, 30 hollow membrane fibers in wet state were measured for inner diameter (I.D.) and wall thickness.

For the measurement, an optical microscope OPTIPHOT-POL manufactured by Nikon K.K. of Japan was used. The results are shown in Table 2. As to Examples 2-7, it was observed that swelling or expansion of the hollow fiber membranes in the partition region was suppressed with minimized throttling in inner diameter of the hollow fiber membranes.

TABLE 2

|      | Dry state | | Wet state | |
| --- | --- | --- | --- | --- |
|      | I.D. ($\mu$m) | Wall ($\mu$m) | I.D. ($\mu$m) | Wall ($\mu$m) |
| E 2  | 198.3 ± 13.8 | 17.1 ± 5.0 | 199.6 ± 12.9 | 21.7 ± 2.2 |
| E 3  | 197.5 ± 18.9 | 18.9 ± 4.9 | 197.8 ± 9.9  | 21.1 ± 1.5 |
| E 4  | 196.3 ± 14.9 | 19.2 ± 3.2 | 195.2 ± 15.0 | 22.0 ± 1.4 |
| E 5  | 198.8 ± 13.8 | 16.7 ± 1.2 | 193.7 ± 14.5 | 21.0 ± 1.5 |
| E 6  | 197.5 ± 18.9 | 17.1 ± 2.3 | 195.8 ± 11.7 | 21.9 ± 1.4 |
| E 7  | 197.7 ± 11.6 | 18.3 ± 2.1 | 194.2 ± 12.0 | 21.0 ± 2.5 |
| CE 2 | 201.8 ± 15.2 | 17.0 ± 4.3 | 172.0 ± 14.4 | 30.0 ± 1.8 |

Experiment 5

An extracorporeal circulation test was carried out using two grown-up hybrid dogs (body weight 11 kg and 14 kg). Under general anesthesia, the right or left arteria carotis communis was carefully separated without damaging the nerve, arborescent vessels and surrounding tissue. A dwell catheter filled with physiological saline was inserted and secured by ligation.

Figure 4:
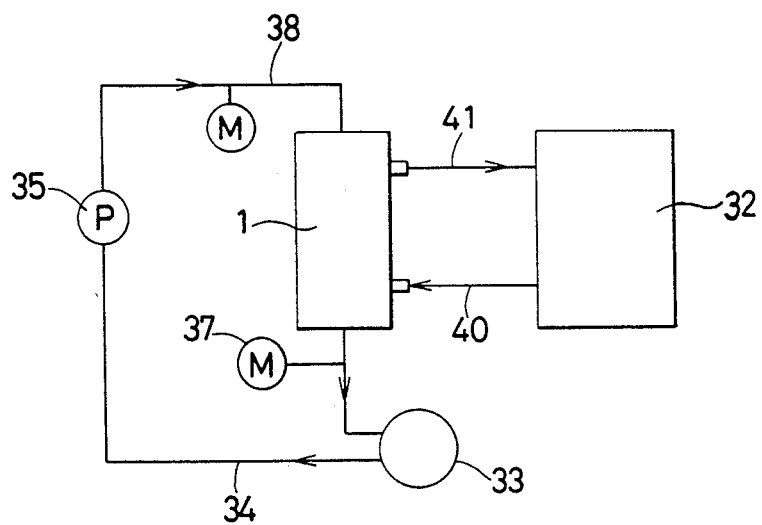
FIG. 4 is a schematic illustration of an extracorporeal circuit used in an experiment of the apparatus of the invention.

Using the thus operated dogs, the test was carried out in an experimental circuit as shown in FIG. 4. The test used the sterilized artificial hollow fiber membrane dialyzers (effective membrane surface area 0.8 m$^2$) fabricated in Example 3 and Comparative Example 2. As shown in FIG. 4, the experimental circuit includes a line 34 which is connected to the artery of the dog 33 and to the inlet of the dialyzer 1 through a pump 35. A line 39 is connected between the outlet of the dialyzer 1 and the vein of the dog 33. A manometer 36 is connected to the line 38 upstream of the dialyzer and another manometer 37 is connected to the line 39 downstream of the dialyzer. The dialyzing fluid inlet and outlet ports of the dialyzer 1 are connected to a dialyzing fluid supply 32 via tubes 40 and 41. The circuit of the above-mentioned construction including the dialyzer 1 was first primed with one liter of physiological saline.

The extracorporeal circulation test was carried out at a blood flow rate of 150 ml/min. and a dialyzing fluid flow rate of 500 ml/min. at 39° C. Blood was circulated for 2 hours without adding an anticoagulant such as heparin while the pressure drop across the dialyzer was measured with the upstream and downstream manometers.

Figure 5:
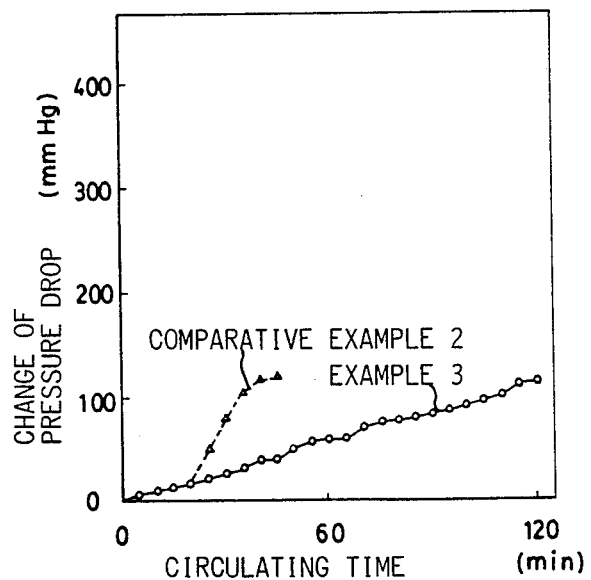
FIG. 5 is a diagram showing a change of the pressure drop across the dialyzer with circulating time in the experiment.
Figure 6:
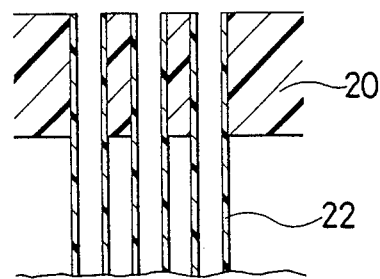
FIG. 6 is an enlarged cross section showing a portion of hollow fiber membranes embedded in the partition in dry state in a prior art dialyzer.
Figure 7:
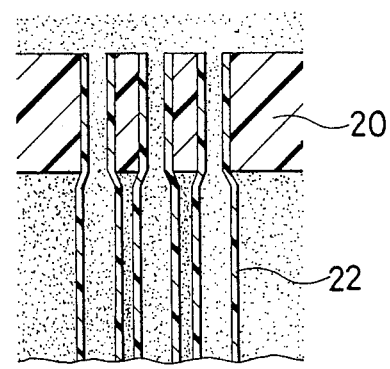
FIG. 7 is an enlarged cross section similar to FIG. 6 showing the hollow fiber membranes in wet state.

A change of pressure drop with time was plotted in FIG. 5. In the dialyzer of Comparative Example 2, the pressure drop abruptly jumped up at about 45 minutes of circulation, resulting in circulation failure. In the dialyzer of Example 3, the pressure drop slowly increased over the 2 hours period.

The operation of the hollow fiber membrane fluid processing apparatus of the present invention is described by referring to the artificial hollow fiber membrane dialyzer shown in FIG. 1.

The dialyzer 1 of the invention is generally incorporated in an extracorporeal circulation circuit (not shown). The circuit including the dialyzer 1 is primed before blood enters the dialyzer 1 through the (upper) blood inlet 7. The incoming blood flows in contact with the inside surface of the hollow fiber membranes 3 while dialyzing fluid enters the dialyzer through the lower inlet 11 and flows in contact with the outside surface of the hollow fiber membranes 3. During the counter flow process, excess water and spodogenous substances such as urea nitrogen, uric acid and creatinine in blood migrate across the membranes into the dialyzing fluid. The concentration of electrolytes such as K, Na, Cl and P is also adjusted during the process. The blood exits the dialyzer from the (lower) blood outlet 8. Since the hydrophobic resin coating 4 is present on the inside surface of the membranes 3 in the portion embedded in the partition 5 (or 8) or the inside surface is treated with a reactive reagent, the inside surface of the membranes 3 in the portion embedded in the partition is hydrophobic or repellent to water. When contacted with physiological saline for priming and blood, the inside surface portion of the membranes does not swell or absorb water to a substantial extent. The membranes in this portion maintain their original inner diameter substantially unchanged without expansion of their wall.

As described above, the present invention provides a hollow fiber membrane fluid processing apparatus comprising a housing having opposed open ends, a fiber bundle received in the housing and including a plurality of hollow fiber membranes for processing fluid, partitions fluid tightly securing the opposed ends of the fiber bundle to the corresponding ends of the housing, a space being defined by the outer surface of the membranes, the inner surface of the housing, and the partitions, an inlet and an outlet for a first fluid disposed in the housing adjacent the opposed ends thereof in fluid communication with the space, and an inlet and an outlet for a second fluid disposed at the opposed ends of the housing in fluid communication with the interior of the membranes wherein the portion of the hollow fiber membranes in contact with each of the partitions swells little upon contact with water-containing fluid. When contacted with physiological saline for priming and the second fluid to be processed, typically blood, the inside surface portion of the membranes surrounded by the partition is not impregnated with water to a substantial extent. The membranes in this portion maintain their original inner diameter substantially unchanged without expansion of their wall. No substantial interference is imposed on the flow of the second fluid through the membrane bores in the region surrounded by the partition, avoiding an increase of pressure drop across the apparatus.

In the other form of the present invention, the portion of the hollow fiber membranes in contact with or embedded in each of the partitions absorbs substantially less water than the remaining free portion. When contacted with physiological saline for priming and the second fluid to be processed, typically blood, the inside surface portion of the membranes surrounded by the partition is not impregnated with water to a substantial extent. The membranes in this portion maintain their original inner diameter substantially unchanged without expansion of their wall. No substantial interference is imposed on the second fluid (blood) flow through the membrane bores in the region surrounded by the partition, avoiding an increase of pressure drop across the apparatus as well as the risks of thrombus formation, clogging and blood stagnation.

Obviously many modifications and variations of the present invention are possible in the light of the above teachings. It is therefore to be understood that within the scope of the appended claims the invention may be practiced otherwise than as specifically described.

What is claimed is:

1. A hollow fiber membrane blood processing apparatus comprising
   a housing having opposed open ends,
   a fiber bundle received in said housing and including a plurality of hollow fiber membranes for processing fluid,
   partitions fluid tightly securing the opposed ends of the fiber bundle to the corresponding ends of said housing, a space being defined by the outer surface of said hollow fiber membranes, the inner surface of said housing, and the partitions,
   an inlet and an outlet for a blood processing fluid disposed in said housing adjacent the opposed ends thereof in fluid communication with the space, and
   an inlet and an outlet for blood disposed at the opposed ends of said housing in fluid communication with the interior of the hollow fiber membranes, characterized in that only the portion of said hollow fiber membranes in the vicinity of where the members are in contact with each of said partitions has been treated with a reagent having a reactive group capable of reaction with a polar group that the hollow fiber membranes possess or a material contained in the hollow fiber membranes possesses.

2. The apparatus of claim 1 wherein the hollow fiber membranes are adapted for dialysis.

3. The apparatus of claim 1 wherein the polar group that the hollow fiber membranes posses or a material contained in the hollow fiber membranes possesses is a hydroxyl, amino or carboxyl group.

4. The apparatus of claim 1 wherein the reactive group is an isocyanate, epoxy, thiocyanate, acid chloride or aldehyde group.

5. The apparatus of claim 1 wherein the reagent is selected from the group consisting of diphenylmethane diisocyanate, 2,4-tolylene diisocyanate, carbodiimide modified diphenylmethane diisocyanate, hexamethylene diisocyanate, epichlorohydrin, and 1,4-butanediol diglycidyl ether.

6. A hollow fiber membrane blood processing apparatus
   a housing having opposed open ends,
   a fiber bundle received in said housing and including a plurality of hollow fiber membranes for processing fluid,
   partitions fluid tightly securing the opposed ends of the fiber bundle to the corresponding ends of said housing, a space being defined by the outer surface of said hollow fiber membranes, the inner surface of said housing, and the partitions,
   an inlet and an outlet for a blood processing fluid disposed in said housing adjacent the opposed ends thereof in fluid communication with the space, and
   an inlet and an outlet for blood disposed at the opposed ends of said housing in fluid communication with the interior of the hollow fiber membranes,
   characterized in that only the portion of said hollow fiber membranes in the vicinity of where the membranes are in contact with each of said partitions has a hydrophobic material coated thereon or incorporated therein.

7. The apparatus of claim 6 wherein the hollow fiber membranes are adapted for dialysis.

8. The apparatus of claim 7 wherein the hollow fiber membranes are hydrophilic hollow fiber membranes adapted for dialysis.

9. The apparatus of claim 6 wherein the partitions are coated on their outside surface with a hydrophobic material.

10. The apparatus of claim 9 wherein the hydrophobic material is silicone, urethane or fluoride resin.

* * * * *